(12) United States Patent
Nishikawa

(10) Patent No.: US 7,990,883 B2
(45) Date of Patent: Aug. 2, 2011

(54) COMMUNICATION SYSTEM, COMMUNICATION METHOD, COMMUNICATION APPARATUS, COMMUNICATION CONTROL METHOD, AND COMPUTER PROGRAM

(75) Inventor: Kenzo Nishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 2221 days.

(21) Appl. No.: 10/836,269

(22) Filed: May 3, 2004

(65) Prior Publication Data
US 2004/0264425 A1 Dec. 30, 2004

(30) Foreign Application Priority Data

May 16, 2003 (JP) .................................. 2003-138675

(51) Int. Cl.
*H04L 12/26* (2006.01)
*H04W 4/00* (2009.01)
(52) U.S. Cl. ........................... 370/252; 370/329; 455/434
(58) Field of Classification Search .................... None
See application file for complete search history.

(56) References Cited

U.S. PATENT DOCUMENTS

| | | | | |
|---|---|---|---|---|
| 6,028,853 | A * | 2/2000 | Haartsen | 370/338 |
| 6,636,738 | B1 * | 10/2003 | Hayashi | 455/450 |
| 7,231,215 | B2 * | 6/2007 | Lewis et al. | 455/450 |
| 7,302,227 | B2 * | 11/2007 | Sakoda | 455/41.2 |
| 7,502,365 | B2 * | 3/2009 | Yamagata | 370/366 |
| 2002/0075940 | A1 * | 6/2002 | Haartsen | 375/132 |
| 2002/0115458 | A1 * | 8/2002 | Mizuno et al. | 455/507 |
| 2002/0131371 | A1 * | 9/2002 | Rudnick | 370/252 |
| 2002/0164963 | A1 * | 11/2002 | Tehrani et al. | 455/101 |
| 2002/0181417 | A1 * | 12/2002 | Malhotra et al. | 370/329 |
| 2002/0181434 | A1 * | 12/2002 | Kruys | 370/347 |
| 2002/0188723 | A1 * | 12/2002 | Choi et al. | 709/225 |
| 2003/0128690 | A1 * | 7/2003 | Elliott et al. | 370/351 |
| 2003/0171116 | A1 * | 9/2003 | Soomro | 455/434 |
| 2003/0186724 | A1 * | 10/2003 | Tsutsumi et al. | 455/561 |
| 2004/0022223 | A1 * | 2/2004 | Billhartz | 370/338 |
| 2004/0057409 | A1 * | 3/2004 | Kennedy | 370/338 |
| 2005/0117549 | A1 * | 6/2005 | Kanterakis et al. | 370/335 |
| 2005/0192016 | A1 * | 9/2005 | Zimmermann et al. | 455/450 |
| 2005/0281347 | A1 * | 12/2005 | Li | 375/267 |
| 2006/0029023 | A1 * | 2/2006 | Cervello et al. | 370/333 |
| 2006/0215593 | A1 * | 9/2006 | Wang et al. | 370/315 |
| 2009/0040989 | A1 * | 2/2009 | da Costa et al. | 370/338 |

* cited by examiner

*Primary Examiner* — Ricky Ngo
*Assistant Examiner* — Clemence Han
(74) *Attorney, Agent, or Firm* — Oblon, Spivak, McClelland, Maier & Neustadt, L.L.P.

(57) ABSTRACT

In a self-organized distributed communication system utilizing a plurality of communication channels, improvement of a channel capacity is intended increase while using an access control method by carrier sensing. A station receives a beacon signal through each communication channel and grasps relative time information regarding to transmission/reception time of the beacon signal and communication channel information regarding a communication channel through which the beacon signal is transmitted/received. A new entry station obtains logical add (OR) of the grasped information to hold the time information and the communication channel information of the beacon signal. On transmitting/receiving data, the station switches the communication channel to use in accordance with the time information and the communication channel information to transmit a beacon signal to try communication.

19 Claims, 13 Drawing Sheets

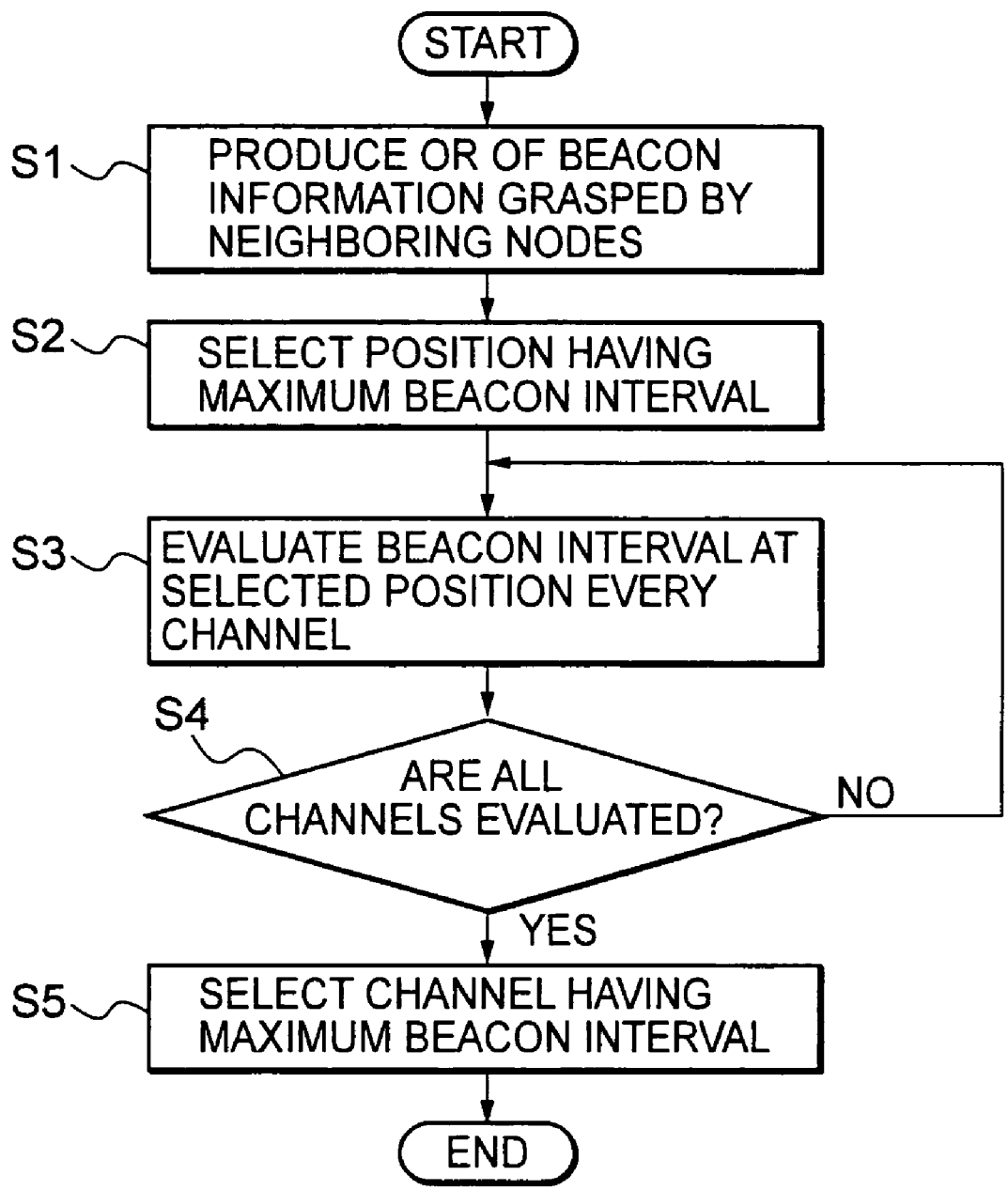

FIG. 8A

| CH2 | 0 | CH3 | 0 | CH2 | CH1 | 0 | 0 |

FIG. 8B

| CH2 | 0 | CH3 | 0 | CH2 | CH1 | 0 | 0 |

| C H 1 | C H 2 | 0 | 0 |

FIG. 15B

| 0 | C H 2 | 0 | 0 |

FIG. 16

|  | CH1 | CH2 | CH3 | CH4 |
|---|---|---|---|---|
| NUMBER OF DATA ERRORS | 0 | 8 | 1 | 2 |
| STANDBY TIME | 0 | 100 | 100 | 10 |

⇩

|  | CH1 | CH2 | CH3 | CH4 |
|---|---|---|---|---|
| NUMBER OF EFFECTIVE DATA ERRORS | 0 | 8 | 1 | 2 |

COMMUNICATION SYSTEM, COMMUNICATION METHOD, COMMUNICATION APPARATUS, COMMUNICATION CONTROL METHOD, AND COMPUTER PROGRAM

CROSS REFERENCES TO RELATED APPLICATIONS

The present document is based on Japanese Priority Documents JP 2003-138675 and 2004-113878 filed in the Japanese Patent Office on May 16, 2003 and Apr. 8, 2004, respectively, the entire contents of which being incorporated herein by reference.

BACKGROUND OF THE INVENTION

1. Field of the Invention

The present invention generally relates to a communication system and a communication method, in which a plurality of wireless communication stations severally operates as if each of them is controlled under self-organized distributed control to form a wireless network including a plurality of communication channels for performing data communication among the plurality of wireless communication stations, a communication apparatus, a communication control method and a computer program to be used in the communication system and the communication method. In particular, the present invention relates to a communication system, a communication method, a communication apparatus, a communication control method and a computer program, all can be suitably applied to the so-called wireless local area network (WLAN).

2. Description of Related Art

Wireless communication techniques for connecting various information processing stations, such as personal computers and personal digital assistants, and their peripheral equipment wirelessly have recently been developed. As a representative one of the techniques, the wireless LAN complying with the so-called Institute of Electrical and Electronics Engineers (IEEE) 802.11 system has been spreading.

In the wireless LAN of the IEEE 802.11 system, contention-free periods for performing media access control (MAC) by polling and contention periods for performing the media access control by carrier sensing are standardized as a technique of the media access control system pertaining to a protocol of distributed control, centralized control or the like of a data link layer. The contention periods for performing the carrier sensing are widely used.

In specific, Carrier Sense Multiple Access with Collision Avoidance (CSMA/CA) system following the self-organized distributed control system used in the so-called Ethernet (registered trademark) is standardized as the contention periods. The CSMA/CA system is a system roughly described as follows. That is, a communication station trying to transmit data performs carrier sensing in advance, lest the data should collide with data transmitted by another communication station, to confirm the status of a communication channel to be used. When a band of the communication channel is unused, the former communication station transmits the data. When the band is in use, the communication station postpones the transmission of the data until the band becomes an idle state. The wireless LAN of the IEEE 802.11 system provides an infrastructure mode and an ad hoc mode. In the infrastructure mode, there exists an access point (AP) as a control station and a plurality of stations (STA's) existing in a range where a radio wave of the access point (AP) is reachable are under control of the access point. In the ad hoc mode, there exists no access point and a plurality of stations operates as if each of them is controlled under self-organized distributed control as the methods of networking based on the concept of the so-called basic service set (BSS). Both of the access point and the plurality of stations perform communication by following the processes complying with the CSMA/CA system.

To put it concretely, the communication operation performed in the wireless LAN of the IEEE 802.11 system will be described below.

First, the operation in the infrastructure mode will be described.

In the BSS of the infrastructure mode, an access point for performing coordination is essential in a system. In the infrastructure mode, for example as shown in FIG. 19, a range of a radio wave of an access point STA0 is collected as a BSS to constitute an area corresponding to a cell in the so-called cellular system. Consequently, stations STA1 and STA2 included in the range of the radio wave of the access point STA0 join a network as a member of the BSS. Then, the access point STA0 transmits control signals called "beacons" at predetermined time intervals. Accordingly, each of the stations STA1 and STA2 receives the beacon signals, and thereby recognizes the access point STA0 existing in the neighborhood. Then, each of the stations STA1 and STA2 performs establishment of a connection to the access point STA0.

As described above, the access point STA0 transmits the beacon signals at the predetermined time intervals. The next transmission time of one of the beacon signals is determined by a parameter described in the beacon signal. The parameter is called a target beacon transmission time (TBTT). Each of the stations STA1 and STA2 receives the beacon signals and refers to the TBTT. Thereby, the stations STA1 and STA2 can grasp the next transmission time of the beacon signal. Consequently, for example, in a case where there are no needs of receiving the beacon signals, each of the stations STA1 and STA2 can also shut off the power source of its receiver for the next TBTT or for a plurality of TBTT's hence to shift to a sleep mode.

Next, the operation in the ad hoc mode will be described.

In the ad hoc mode, each station self-organizedly defines an independent BSS (IBSS) by performing predetermined negotiations with the other stations. In the ad hoc mode, for example, as shown in FIG. 20, when the IBSS has been defined, each of the stations STA1 and STA2 determines a TBTT after the negotiations at every passage of the predetermined time interval. Then, when each of the stations STA1 and STA2 recognizes the arrival of one of the TBTT's by referring to a clock equipped in each of the stations STA1 and STA2, and when each of the stations STA1 and STA2 recognizes that no other stations transmit any beacon signals after a retardation for a period of time determined by uniform random numbers, each of the stations STA1 and STA2 transmits a beacon signal.

Incidentally, also in the IBSS, each of the stations STA1 and STA2 can shut off the power source of its transmitter/receiver for the next TBTT or for a plurality of TBTT's hence to shift to a sleep mode as the need arises. To a case where a sleep mode is applied in an IBSS, the IEEE 802.11 system defines a predetermined time zone from a TBTT as an announcement traffic indication message (ATIM) window.

All of the stations belonging to an IBSS operate their receivers in the time zone of an ATIM window. In this time zone, it is basically made to be possible to perform a reception even when the stations operate in their sleep modes. When each station holds data which should be transmitted to an arbitrary station, the station informs the arbitrary station of the holding of the data to be transmitted by transmitting an ATIM packet to the arbitrary station after the transmission of a beacon signal in the ATIM window time zone. Then, the station which has received the ATIM packet operates its receiver until the station has completed the reception from the station which has transmitted the ATIM packet.

Now, for describing the operation concretely, for example, as shown in FIG. 21, a case where three stations STA1, STA2 and STA3 are present in the IBSS is explained. In this case, each of the stations STA1, STA2 and STA3 watches the states of media over a period of time determined by uniform random numbers while operating a timer of a backoff provided for the avoidance of collisions of data after the time of TBTT has elapsed. Hereupon, a case where the timer of the station STA1 has completed its count fastest and the station STA1 has transmitted a beacon signal is shown. In this case, because the other stations STA2 and STA3 have recognized the transmission of the beacon signal by the station STA1, the stations STA2 and STA3 do not transmit any beacon signals.

Moreover, it is supposed that the station STA1 holds data addressed to the station STA2 and the station STA2 holds data addressed to the station STA3. First, when the stations STA1 and STA2 have completed the transmission and the reception of beacon signals, the stations STA1 and STA2 again operate the timers of backoff while watching the states of media over periods of time determined by uniform random numbers. Hereupon, when it is supposed that the timer of the station STA2 has completed its count fastest, the station STA2 transmits an ATIM packet to the station STA3. In response to the transmission of the ATIM packet, the station STA3 transmits the so-called acknowledgement (ACK) signal after a predetermined period of time, or a short inter frame space (SIFS), from the reception of the ATIM packet. Then, when the transmission of the ACK signal from the station STA3 has been completed, the station STA1 watches the states of media over a period of time determined by uniform random numbers while operating the backoff timer. When the period of time set in the timer has elapsed, the station STAL transmits an ATIM packet to the station STA2. In response to the transmitted ATIM packet, the station STA2 transmits an ACK signal after a predetermined period of time SIFS from the reception of the ATIM packet.

In the wireless LAN of the IEEE 802.11 system, when the transmissions and the receptions of such an ATIM packet and an ACK packet have been performed in the time zone of the ATIM window, the station STA3 operates the receiver for receiving data from the station STA2, and the station STA2 operates the receiver for receiving data from the station STA1 even in the intervals after the transmissions and the receptions. Then, in the wireless LAN of the IEEE 802.11, the stations which have not received any ATIM packets in the time zone of the ATIM window and the stations which do not hold any data which should be transmitted can shut off the power sources of the transmitter/receivers until the next TBTT to achieve reduction of their electric power consumption.

Incidentally, as the technique pertaining to the access control at the time of such wireless communication, for example, a technique described in Patent Document 1 is noted. Patent Document 1 discloses the technique for a cordless handset to detect the existence of the radio waves of control signals from other base phones at an interval of the transmission timing of control signals from a base phone in response to an inquiry of an radio wave situation by the base phone, and to report the existence information of the radio waves to the base phone. Then, Patent Document 1 disclose a technique such that the base phone detects time difference between the transmission timing of another base phone and the transmission timing of the own station when a radio wave of a control signal of the other base phone is present, and that the base phone changes the transmission timing of the control signal of the base phone when the detected time difference is equal to or less than a previously determined value.

[Patent Document 1] Japanese Patent Application Publication Hei 8-217914

Now, the wireless LAN of the IEEE 802.11 system uses the so-called unlicensed spectrum (bandwidth) such as 5.2 GHz band and 2.4 GHz band. Those bands are further divided into a plurality of bands. Each communication station performs communication using one of the divided bands. For example, in the IEEE 802.11a, the band of 5.2 GHz is divided into four bands by the 20 MHz. A station trying to perform wireless communication selects one of the divided bands as its communication channel.

Hereupon, in the wireless LAN of the IEEE 802.11 system, as described above, communication is started after confirmation of unoccupied communication channels in accordance with processes complying with the CSMA system. Consequently, it is necessary for the stations performing the wireless communication to use the same communication channel. Hence, in the wireless LAN, though the band is divided and a plurality of communication channels are prepared, the communication channel which is actually used for transmission of signals is substantially only one channel.

Moreover, because those bands are unlicensed spectrum, there can be a case where wireless LAN's of systems different from each other use the same communication channel. In such a case, interference from another system can be avoided by changing the communication channel of the own system. However, it is necessary for realizing the avoidance to detect the presence of the other systems.

Incidentally, as a technique for selecting an unoccupied communication channel for avoiding the interference with the other systems in the situation in which a plurality of systems are present, there is a technique described in, for example, Patent Document 2.

[Patent Document 2] Japanese Patent Application Publication No. 2002-158667

Patent Document 2 discloses a technique for selecting an optimum channel to the changes of the neighboring situation by judging the radio wave situations of all of the wireless channels capable of being used by a control station at its rising to determine the optimum channel, and by stopping the transmission of the own network periodically to watch the neighbor radio wave situation by dispersed mobile terminals.

Now, as a wireless communication system different from the wireless LAN, there is a portable cellular phone system called as the so-called personal digital cellular (PDC). In such a portable cellular phone system, a control station manages the control information of stations in a concentrated manner, and controls the communication time and the communication channel of each station.

In a system adopting a centralized control system such as the portable cellular phone system and the infrastructure mode in the wireless LAN of the IEEE 802.11 system, a control station or an access point which performs the centralized control bears a great burden. Moreover, the system becomes large in scale, and the costs for constructing the system increases. Moreover, the system adopting such a centralized control system has a problem of the difficulty of the construction of a network.

On the other hand, in a system adopting a self-organized distributed control system such as the ad hoc mode in the wireless LAN of the IEEE 802.11 system, each station independently judges the neighboring situation, and a network can be easily expanded.

However, the conventional techniques pertaining to the selection of a communication channel such as the technique described in Patent Document 2 and so forth are supposed to be applied to the centralized control system using a control station, an access point and the like, and such conventional techniques cannot be applied to the systems adopting the self-organized distributed control system.

As mentioned above, the system adopting the self-organized distributed control system cannot use an access control system by carrier sensing like the CSMA system while using a plurality of communication channels simultaneously. Consequently, the system adopting the self-organized distributed control system inevitably has a problem of limitations of channel capacities (communication capacities).

SUMMARY OF THE INVENTION

The present invention was made in view of the actual circumstances described above. It is an advantage of the present invention to provide a communication system, a communication method, a communication apparatus, a communication control method, and a computer program all excellent and capable of achieving increase of channel capacity by enabling simultaneous use of a plurality of communication channels while using an access control system by carrier sensing at the time of performing wireless communication adopting an self-organized distributed control system.

A first aspect of the present invention is a communication system forming a network having no relationship of a controlling station and a controlled station, in which a plurality of communication stations respectively operate in a self-organized distributed control manner, using a plurality of communication channels. In the system, each of the stations manages at least time information and communication channel information. The time information is concerned with transmission/reception time of a beacon signal and the communication channel information is concerned with a communication channel to be used. In the system the communication stations includes a transmitting communication station trying to transmit the beacon signal or data and a receiving communication station trying to receive the beacon signal or the data. The transmitting communication station switches a communication channel to be used in accordance with the time information and the communication channel information to try transmitting the beacon signal or the data, while the receiving communication station switches the communication channel to be used in accordance with the time information and the communication channel information to try receiving the beacon signal or the data.

It is noted that the term "system" herein means a logical aggregation of a plurality of apparatuses (or functional modules for realizing a specific function), and it does not matter if all apparatus or functional modules belonging to the system is included in a single.

In such a communication system according to the present invention, communication can be performed in a stat dispersed to a plurality of communication channels. Consequently, increase of channel capacity can be expected, and the communication channels can be switched according to an interference situation of each communication channel. Moreover, in the communication system according to the present invention, while a plurality of communication channels are used, a network can be formed in accordance with the self-organized distributed control. Consequently, the network can be formed easily and maintained at low cost.

Hereupon, the beacon signal contains the time information and the communication channel information, both grasped by the transmitting communication station which transmits the beacon signal. A wireless communication station newly entering the network can grasp a situation, including the time performing communication and the communication channel in use, of the other wireless communication stations appropriately in accordance with the time information and the communication channel information contained in the beacon signal received from the other wireless communication stations.

The wireless communication station newly entering the network determines a transmission time of a beacon signal to transmit and a communication channel to use in accordance with the grasped time information and communication channel information.

In specific, the wireless communication station newly entering the network superposes all of the time information and the communication channel information contained in the beacon signals received from the other wireless communication stations to produce neighboring station time zone information concerning time zone already used by the other communication stations, and determines the transmission time of the beacon signal to transmit and the communication channel to use depending on the produced neighboring station time zone information.

Thereby, in the communication system according to the present invention, it is possible to avoid the situation in which a wireless communication station transmits a beacon signal at the time and through the communication channel at which another wireless communication station receives a beacon signal.

Moreover, a wireless communication station newly entering the network selects the time when the interval during which no beacon signals are transmitted and received is the longest as the transmission time when the wireless communication station transmits a beacon signal depending on the produced neighboring station time zone information. Moreover, the wireless communication station which newly enters the network divides the produced neighboring station time zone information into time zone information of each communication channel, and evaluates the selected transmission time of the beacon signal at every communication channel. Then, the wireless communication station selects a communication channel having the maximum interval during which no beacon signals are transmitted and received as the communication channel through which the wireless communication station transmits the beacon signal.

Thereby, in the communication system of the present invention, the transmissions and the receptions of beacon signals by each wireless communication station can be dispersed as much as possible, and a period of time up to the next time beacon signal can be made to be longest. Consequently, in the communication system of the present invention, it is possible to divide communication time fairly to each wireless communication station, and to allot the communication channel having the largest communication capacity.

Moreover, a plurality of wireless communication stations severally tries to transmit data after grasping a maximum transmittable time period, which is the longest time that data can be transmitted, depending on time information pertaining to the transmission and reception time of beacon signals of the other wireless communication stations in the communication channel through which transmission is scheduled, and time information pertaining to the transmission and reception time of beacon signals in the other communication channels of a transmission destination wireless communication station.

Thereby, in the communication system of the present invention, an unoccupied time period of the communication channel through which transmission is scheduled can be suitably grasped, and it becomes possible to try to perform transmission until the unoccupied time. Consequently, the communication channels can be used to the utmost limit.

Moreover, a plurality of wireless communication stations severally makes a preamble to be provided in a packet to be transmitted and received be common with preambles to be used in the other systems, and detects the generation of a packet of another system by the generation of an error in a part after the preamble. The plurality of wireless communication stations severally changes a using communication channel on the frequency of the generation of the packets of the other systems.

Thereby, the communication system of the present invention can detect interference from another system, and flee to another communication channel in which interference is less. As a result, in the communication system of the present invention, the collision of data becomes less, and the improvement of a throughput can be achieved.

Moreover, a plurality of wireless communication stations records reception time in each communication channel as well as the frequency of the generation of packets in the other systems. When the reception time exceeds a predetermined period of time, the plurality of wireless communication stations updates the number of the errors at that time as an effective value to be used for the judgment of a change of the communication channel.

Thereby, in the communication system of the present invention, the interference situations of the communication channels of the other systems can be fairly compared among the other systems. Moreover, in the communication system of the present invention, because the update of the material to be used for the judgment of a change of the communication channels is continuously performed, changes of the interference situations can be suitably considered.

Moreover, when a wireless communication station which receives data detects interference, the wireless communication station requires the changes of the transmission time of the beacon signals and the communication channel to be used to the wireless communication station transmitting data using the communication channel in which the interference is generated.

As described above, in the communication system of the present invention, detection of interference on a reception side makes it possible to avoid using a communication channel being in a bad reception situation and to suitably change the communication channel to a better communication channel.

Moreover, when a wireless communication station to transmit data detects interference, the wireless communication station measures the number of times of nonexistence of responses from a wireless communication station to receive data. When the frequency of the nonexistence of responses exceeds a predetermined value, the wireless communication station changes the transmission time of the beacon signals and the communication channel to be used.

As described above, in the communication system of the present invention, detection of interference on a transmission side makes it possible to recognize deterioration of the reception situation of a transmission destination on the transmission side and to spontaneously change the wireless communication station on the transmission side can the communication channel to a suitable one on an own judgment.

According to a second aspect of the present invention, there is provided a communication method basically similar to a communication system of the first aspect of the present invention.

A third aspect of the present invention provides a communication apparatus and a fourth aspect of the present invention provides a computer program as well. According to the third aspect of the invention, the communication apparatus forms a network having no relationship of a controlling station and a controlled station, in which a plurality of communication stations respectively operate in a self-organized distributed control manner, using a plurality of communication channels. The apparatus includes communication means, communication control means, beacon generating means, beacon analyzing means. The communication means transmits/receives wireless data on a communication channel. The communication control means sets a communication channel to use and controls data transmission/reception in the communication means. The beacon generating means generates a beacon signal, and the beacon analyzing means analyzes the beacon signal received from a neighboring station. In addition, the communication control means at least manages time information regarding to transmission/reception time of the beacon signal and communication channel information regarding to the communication channel to use, switches the communication channel to use in accordance with the time information or the communication channel information to try transmission of the beacon signal or data, and receives the beacon signal or the data by switching the communication channel to use in accordance with the time information and the communication channel information at the time of receiving the beacon signal or the data.

As described above, in the present invention, each station, which operates in accordance with self-organized distributed control and forms a wireless network including a plurality of communication channels, holds time information pertaining to the transmission and reception time of beacon signals, and communication channel information pertaining to a communication channel to be used, and each station periodically transmits the beacon signals at predetermined time intervals on the above-mentioned pieces of information. Thereby, the present invention enables the easy building of a wireless network which can use a plurality of communication channels simultaneously while performing access control by carrier sense, and which can increase a channel capacity in a large scale at a low cost and can perform communication with avoiding a communication channel in which interference is generated.

Characteristic features and advantages of the present invention will become apparent by reference to more precise description based on embodiments of the present invention and attached drawings.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 5 is a view illustrating a state in which beacon signals are transmitted from a plurality of stations sequentially and priority periods are allotted;

FIGS. 6A and 6B are views illustrating the contents of beacon signals, in which FIG. 6A shows relative time information pertaining to transmission and reception time of receivable beacon signals grasped by each station, and frequency information of the communication channels to which the beacon signals are transmitted, and FIG. 6B shows examples of contents held by each station as information described in NBOI fields in the beacon signals;

FIG. 7 is a flowchart illustrating a series of processes at the time when a new entry station determines the transmission time of a beacon signal to be transmitted by the station itself and the frequency of the communication channel to be used;

FIGS. 8A, 8B and 8C are views illustrating examples of logical addition (OR) information produced by a new entry station on a beacon signal from another station, in which FIG. 8A shows an example of neighboring station time zone information comprised of a logical addition (OR) produced by superposing all of relative time information for transmitting and receiving beacon signals grasped by the other station, and the frequency information of a communication channel, and FIG. 8B shows a state in which a position having the maximum interval of the transmissions and the receptions of beacon signals is selected on the neighboring station time zone information shown in FIG. 8A, and further FIG. 8C is a view showing a state in which the neighboring station time zone information shown in FIG. 8A is divided at every communication channel and a communication channel having the maximum interval of the transmissions and the receptions of the beacon signals is selected;

FIGS. 14A, 14B, 14C and 14D are views showing examples of the transmission and reception time information of beacon signals grasped by each station shown in FIG. 12 and the frequency information of communication channels, in which FIG. 14A shows an example grasped by the station STA2, and FIG. 14B shows an example grasped by the station STA1, and FIG. 14C shows an example of the information grasped by the station STA3, and FIG. 14D is a view showing an example of the information grasped by the station STA4;

FIGS. 15A and 15B are views showing examples of the information obtained as a result of the operation such that the stations STA2 and STA3 shown in FIG. 12 extract the information of communication channels which the stations STA2 and STA3 themselves use from the time information and the communication channel information of the beacon signals related to the other stations, the time information obtained at the time of the new entry to a network of the stations STA2 and STA3, and the frequency information of the communication channels, and implement the logical addition operation of the extracted information, and the operation of the logical addition of the time information at the other communication channel of the station STA1, which is a transmission destination, in which FIG. 15A shows an example of the information obtained by the station STA2, and FIG. 15B is a view showing an example of the information obtained by the station STA3;

FIG. 16 is a view illustrating the state in which each station records the numbers of generation of packets (the numbers of data errors) of the other systems and reception time at each communication channel for detecting the presence of the other systems;

DETAILED DESCRIPTION OF THE PREFERRED EMBODIMENTS

In the following, the attached drawings will be referred to while a concrete embodiment to which the present invention is applied is described in detail.

In a network according to an embodiment of the present invention, there exists no access points (AP's) and a plurality of stations (STA's) as wireless communication stations operate in a self-organized distributed way, respectively, to form a wireless network. In the present embodiment, each station periodically transmits beacon signals at predetermined time intervals. The communication system makes it possible to use a plurality of communication channels simultaneously while adopting the so-called carrier sense multiple access (CSMA) system. In the CSMA system, a transmitting station performs access control with carrier sensing. In the access control, each of the stations at least holds time information pertaining to the transmission and reception time of the beacon signals and communication channel information pertaining to a communication channel to be used. In a case where a transmitting station tries to transmit data, it switches the communication channel to be used on the above-mentioned information and transmits the beacon signals for performing communication.

Figure 1:
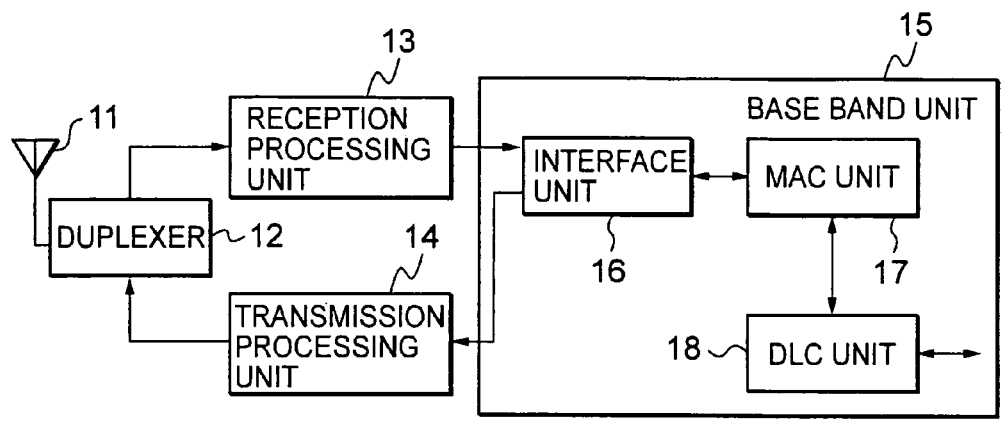
FIG. 1 is a block diagram illustrating the configuration of a station provided in a communication system as an embodiment of the present invention.

FIG. 1 schematically shows a structure of a wireless communication apparatus functioning as a station in the communication system according to the present embodiment. As shown in FIG. 1, each station in the communication system is severally configured to connect an antenna 11 as communication means to a transmission processing unit 14 and a reception processing unit 13 through a duplexer 12, and to connect the transmission processing unit 14 and the reception processing unit 13 to a base band unit 15.

The transmission processing unit 14 performs various processing, such as an analog-to-digital (A/D) conversion and a modulation, of base band signals supplied from the base band unit 15. Moreover, the transmission processing unit 14 converts the base band signals to, for example, radio frequency (RF) signals, and then supplies the converted RF signals to the duplexer 12. Incidentally, as a transmission processing system in the transmission processing unit 14, various systems suitable for relatively short distance communication applicable to a wireless LAN can be applied. In specific, the so-called ultra wideband (UWB) system, the orthogonal frequency division multiplexing (OFDM) system, the code division multiple access (CDMA) system and the like can be applied. On the other hand, the reception processing unit 13 converts received signals to RF signals and performs various processing such as a digital-to-analog (D/A) conversion and a demodulation to obtain base band signals. The reception processing unit 13 supplies the obtained base band signals to the base band unit 15 functioning as control means.

The base band unit 15 includes an interface unit 16, a media access control (MAC) unit 17, a data link control (DLC) unit 18 and the like. The base band unit 15 executes processing, such as production of beacon signals, at each layer in a media access control system implemented in the communication system. At this time, the base band unit 15 at least holds the time information pertaining to the transmission and reception time of the beacon signals, and the communication channel information pertaining to the communication channel to be used, and switches the communication channel to be used on the time information and the communication channel information.

Figure 2:
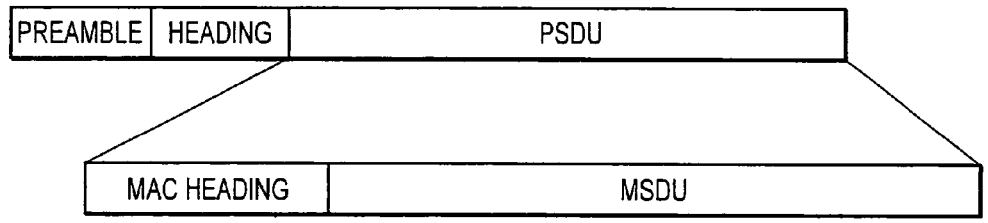
FIG. 2 is a view illustrating a format of a packet to be transmitted and received in the communication system.

A packet to be transmitted and received in the communication system forming a network composed of such stations has a format, for example, as shown in FIG. 2. As shown in the figure, the packet is composed of a preamble, a heading area, and a payload unit.

The preamble is provided at a beginning of the packet, and is composed of a specific word. The preamble is provided in order to inform the presence of the packet.

The heading area is provided immediately after the preamble. The heading area describes the information indicating an attribute, a data length and a transmission power of the packet. The heading area moreover describes the information indicating a transmission rate of the payload unit in a case where a physical layer is in a multi-transmission rate mode. A transmission speed of the heading area is decreased at the time of transmission in order that a necessary signal to noise ratio (SNR) may be lower than that of the payload unit by about several dB. Incidentally, the heading area is different from the so-called MAC header, which is stored in the payload unit.

The payload unit is depicted as PSDU, which means a physical layer (PHY) service data unit, in FIG. 2, and is provided immediately after the heading area. The payload unit describes substantive information, such as a control signals and data, which should be transmitted by the packet. The payload unit is composed of the MAC header and a MAC service data unit (MSDU), and a data sequence handed to the MSDU from a higher layer is described therein.

Figure 3:
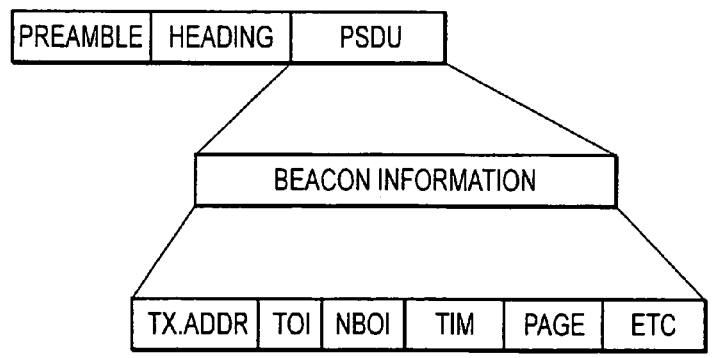
FIG. 3 is a view illustrating a format of a beacon signal to be transmitted and received in the communication system.

Now, the beacon signals to be transmitted and received between each station are stored in the payload unit, and it is described in the heading area that the packet is a beacon signal. FIG. 3 shows an example of a format of a beacon signal. The beacon signal shown in FIG. 3 is at least composed of a MAC address (TX.ADDR) field for describing the MAC address of the station to transmit the packet, a TBTT offset indicator (TOI) field describing an offset value at the time of an intentional shift of the transmission timing of the beacon signal from a target beacon transmission time (TBTT) in order to avoiding the continuous collision of beacon signals, a neighboring beacon offset information (NBOI) field, a traffic indication map (TIM) field, a paging (PAGE) field and the other field (ETC).

In the NBOI field, which will be described in detail later, the information indicating a position (receipt time) of a beacon signal which the station transmitting the beacon signal can receive as a relative position to the position of the beacon signal of the station, and the frequency information pertaining to the communication channel are described.

Moreover, in the TIM field, the notice information indicating an addressed person of data held by the station transmitting the beacon signal is described. The station which should receive the data can recognize the necessity of the reception by referring to the TIM.

Moreover, in the paging field, a receiving station scheduling the transmission of data in a priority period, which will be described later, among the receiving stations described in the TIM is described. The station appointed in the paging field can prepare for the reception in a priority period.

In the communication system according to the present embodiment, the transmissions and the receptions of the beacon signals stored in such packets are performed between each station.

Figure 4:
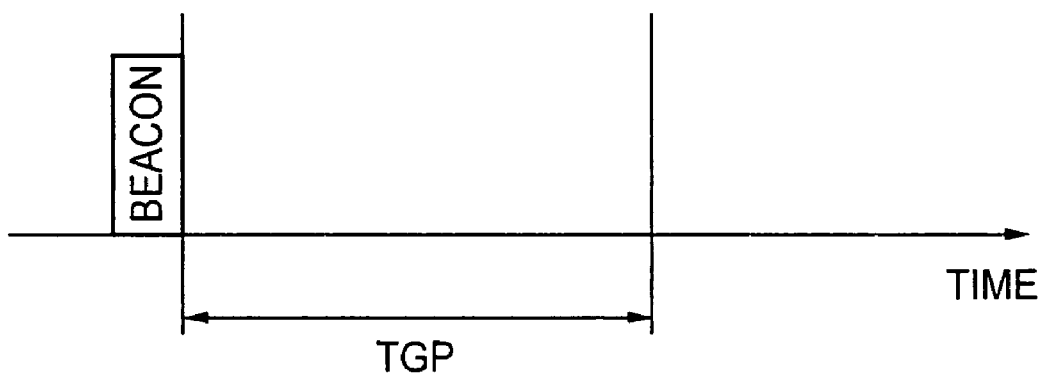
FIG. 4 is a view illustrating a priority period to be allotted to each station which has transmitted a beacon signal.

Now, a priority period, or a transmission guaranteed period (TGP), as shown in FIG. 4, in which it becomes possible to perform communication preferentially in a predetermined time period after the transmission of a beacon signal, is allotted to each station. Incidentally, the priority period is not limited to one starting just after the transmission of a beacon signal as shown in FIG. 4, but, for example, the start time of the priority period may be set as a relative position (time) from the transmission time of a beacon signal. Moreover, the start time of the priority period may be set as a time period from the TBTT.

Figures 5, 6A, 6B:
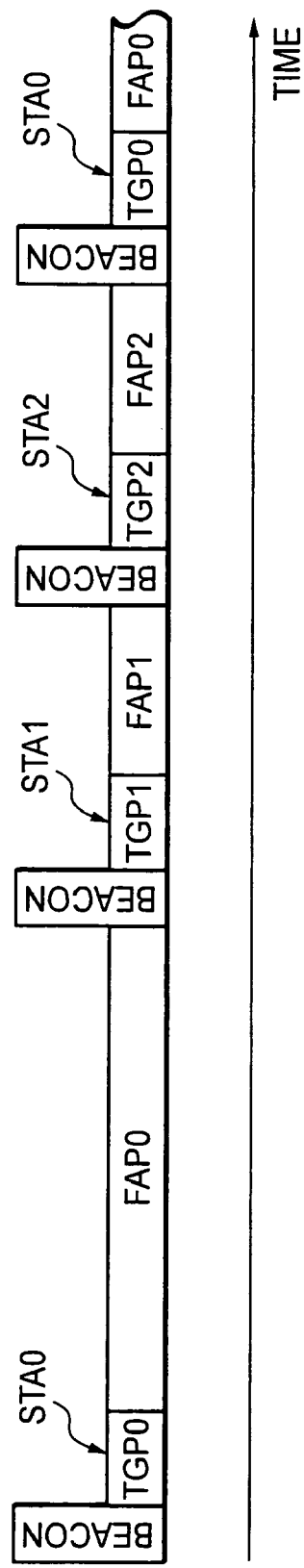

Thereby, in the communication system, for example, as shown in FIG. 5, beacon signals are sequentially transmitted from a plurality of stations, and the priority periods TGP are allotted. Incidentally, in FIG. 5, the time periods other than the priority periods TGP are defined as fairly access periods (FAP's). That is, in the communication system, when three stations STA0, STA1 and STA2 are present, and when the station STA0 transmits a beacon signal, a priority period TGP0 is allotted to the station STA0. Then, when the time period allotted as the priority period TGP0 has elapsed, a succeeding time period until the next transmission of a beacon signal by the station STA1 is a time period FAP0. Similarly, in the communication system, when the time period FAP0 has elapsed, the station STA1 transmits a beacon signal and a priority period TGP1 is allotted to the station STA1. When the time period allotted as the priority period TGP1 has elapsed, a succeeding period is a time period FAP1 until the next station STA2 transmits a beacon signal. Then, in the communication system, when the time period FAP1 has elapsed, the station STA2 transmits a beacon signal, and a priority period TGP2 is allotted to the station STA2. When the time period allotted as the priority period TGP2 has elapsed, a succeeding period of time is a time period FAP2 until the station STA0 transmits a beacon signal.

In the communication system, each station grasps the transmission time of beacon signals as relative time in a long period from the time when the station itself transmits a beacon signal to the time when the state itself transmits the next beacon signal. Then, each station transmits a beacon signal to the other stations at the time when the station can transmit a beacon signal.

Now, in a beacon signal to be used for such a use, as described above, the relative time information pertaining to the transmission and reception time of the beacon signal and the communication channel information pertaining to the communication channel that the station uses are described in the NBOI field. A station newly entering the network (hereinafter referred to as a new entry station) receives beacon signals for one period or longer to each communication channel from neighboring stations thereto, and refers to the NBOI field in each of the beacon signals. Thereby, for example, as shown in FIG. 6A, the new entry station grasps the relative time information pertaining to the transmission and reception time of receivable beacon signals, and the communication channel information of the communication channels through which the beacon signals are transmitted. Incidentally, FIG. 6A shows a case where four communication channels CH1-CH4 are present. In FIG. 6A, portions shown by a letter "B" indicate relative time when the new entry station receives a beacon signal, and portions shown by a numeral "0" indicate the periods of time FAP, shown in FIG. 5 previously, other than the priority periods. Consequently, FIG. 6A shows that a beacon signal is received at seventh time through the communication channel CH1, and that beacon signals are received at the first time and at the fifth time through the communication channel CH2, and that a beacon signal is received at the third time through the communication channel CH3, and that a beacon signal is received at the sixth time through the communication channel CH4.

When each station newly enters a network, each station performs the operation of logical addition of the information grasped with regard to the plurality of communication channels. Thereby, each station holds, for example, the information as shown in FIG. 6B as the information to be described in the NBOI field. That is, the new entry station, which has grasped the relative time information regarding each communication channel shown in FIG. 6A, performs the operation of the logical addition of the relative time information. Then, as shown in FIG. 6B, the new entry station holds the information indicating the transmissions and the receptions of beacon signals using the following channels at each of the following time: the communication channel CH2 at the first time, the communication channel CH3 at the third time, the communication channel CH2 at the fifth time, the communication channel CH4 at the sixth time, and the communication channel CH1 at the seventh time.

Then, the new entry station determines the transmission time of the beacon signals which the station transmits and the communication channel to be used. That is, in a received beacon signal, the relative time information pertaining to the transmission and reception time of the beacon signal, which information is grasped by the station which has transmitted the beacon signal, and the communication channel information pertaining to the communication channel to be used are described. Accordingly, on the basis of the information, the new entry station determines the transmission time of the beacon signals which the station transmits and the communication channels to be used, and updates the information shown in FIG. 6B, which information is held by the new entry station.

In specific, the new entry station executes a series of processes shown in FIG. 7 to determine the transmission time of the beacon signals which the station transmits and (the frequencies of) the communication channels to be used.

First, as shown in FIG. 7, in Step S1, the new entry station receives the beacon signals from neighboring nodes, i.e. peripheral other stations. Then, the new entry station obtains a logical addition by superposing all of the relative time information for transmitting and receiving the beacon signals grasped by the other stations, and the communication channel information pertaining to the communication channel to be used so as to produce neighboring station time zone information regarding time zones which are already used by the other communication stations. Incidentally, hereupon for the sake of convenience of description, it is supposed that the new entry station has produced the neighboring station time zone information as shown in FIG. 8A. That is, the neighboring station time zone information indicates that the beacon signals are transmitted and received at each of the following time using each of the following communication channels: the communication channel CH2 at the first time, the communication channel CH3 at the third time, the communication channel CH2 at the fifth time, and the communication channel CH1 at the sixth time.

Successively, in Step S2, the new entry station selects a position (relative time) having the maximum interval during which no beacon signals are transmitted and received on the produced logical addition information. The process in Step S2 is based on the following consideration. That is, even if a beacon signal is transmitted at a position where no beacon signals are transmitted and received as a result of the logical addition of the information regarding all of the communication channels, the transmitted beacon signal does not collide with any other beacon signals. Moreover, because the transmissions and the receptions of beacon signals are desirably dispersed as much as possible, the selection of the position having the maximum interval makes each period of time until the next time beacon signals the longest, and enables fair division of communication time. To put it concretely, in a case of the neighboring station time zone information shown in FIG. 8A, the interval during which no beacon signals are transmitted and received at from the seventh time to the eighth time is the longest. Consequently, the new entry station selects the eighth time, as shown by a wide line in FIG. 8B.

Successively, in Step S3, the new entry station divides the neighboring station time zone information obtained with the logical addition with regard to all the communication channels produced in Step S1 into the logical addition information of each communication channel, and evaluates the selected transmission time of the beacon signal to each communication channel. Then, in Step S4, the new entry station judges whether the evaluation has been performed to all of the communication channels or not.

Now, in a case where the new entry station has not performed the evaluation to all of the communication channels yet, the new entry station repeats the processes from the Step S3. On the other hand, in a case where the new entry station has completed the evaluation to all of the communication channels, the new entry station shifts the process to Step S5. In Step S5, the new entry station selects the communication channel having the maximum interval of the beacon signal transmission/reception on the evaluation results, and completes the series of processes.

In specific, the new entry station divides the neighboring station time zone information shown in FIG. 8A to each communication channel to produce neighboring station time zone information containing four pieces of logical addition information as shown in FIG. 8C. Each piece of the logical addition information indicates the transmission and the reception of a beacon signal at the following time through the following communication channel: at the sixth time through the communication channel CH1, at the first and the fifth time through the communication channel CH2 and at the third time through the communication channel CH3. Incidentally, no beacon signals are transmitted and received through the communication channel CH4. Then, the new entry station executes the evaluation of the selected transmission time to each communication channel. As the results of the evaluation, it is known that the interval of the communication channel CH4 is the longest with regard to the eighth time selected at the step S2. Consequently, the new entry station selects the communication channel CH4, as shown by a wide line in FIG. 8C.

The new entry station can determine the optimum transmission time of a beacon signal and the frequency of the communication channel to be used by the execution of such a series of processes.

Figure 9:
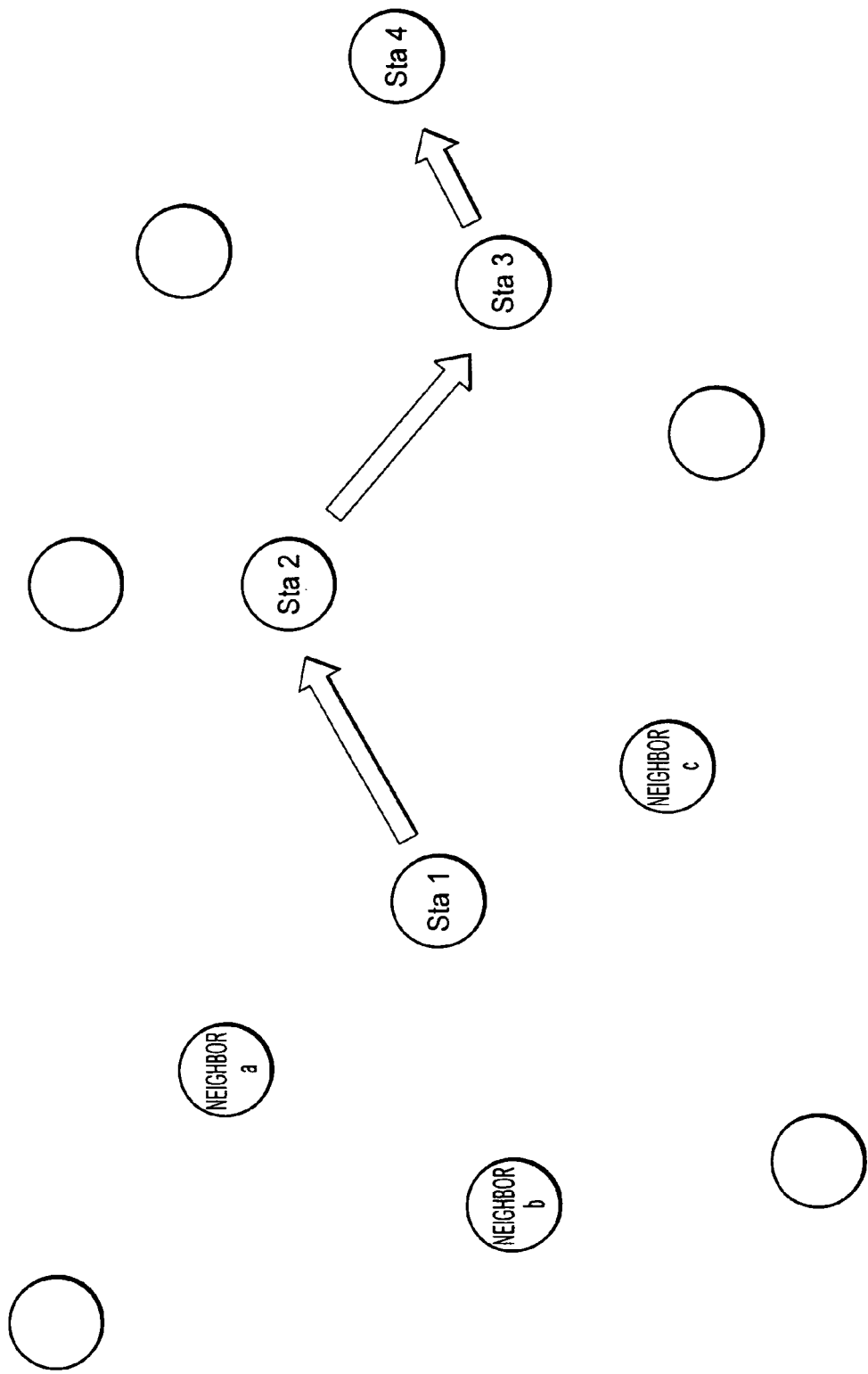
FIG. 9 is a view showing an exemplary structure of a multi-hop link.

Next, in a case where a communication station is allowed to perform reserved communication in the communication system, operations of reserving a communication time zone and a communication channel to perform communication will be described. The reserved communication enables suppressing signal collision in a multi-hop link as shown in FIG. 9 so that an effect of increasing channel capacity is expected.

In the multi-hop link, the communication station has hidden stations which mutually do not know the other's existence. In the example shown in FIG. 9, Sta1 and Sta3 are in relationship of hidden stations each other, for example. However, in a case of reserving a communication time zone and a communication channel used for communication between Sta1 and Sta2, it is necessary to care for avoid overlapping of reservation on the transmission time zone and channel of Sta3 being hidden and not communicable. Therefore, similar to the above-mentioned determination and notification of the beacon transmission/reception time, the NBOI is utilized.

In such a case, each station describes not only the beacon transmission/reception time but also the reserved time zone and communication channel in the NBOI and notify them via the beacon. In a case of reserving communication channels, the station searches unoccupied time zones from the NBOI information of neighboring stations and, after reservation is completed, describes the reservation in the NBOI.

The operational steps in a case where the communication station performs reserved communication will be specifically described. Herein, a case where the Sta1 makes reservation for transmission to the Sta2 in FIG. 9 is considered.

Figure 10:
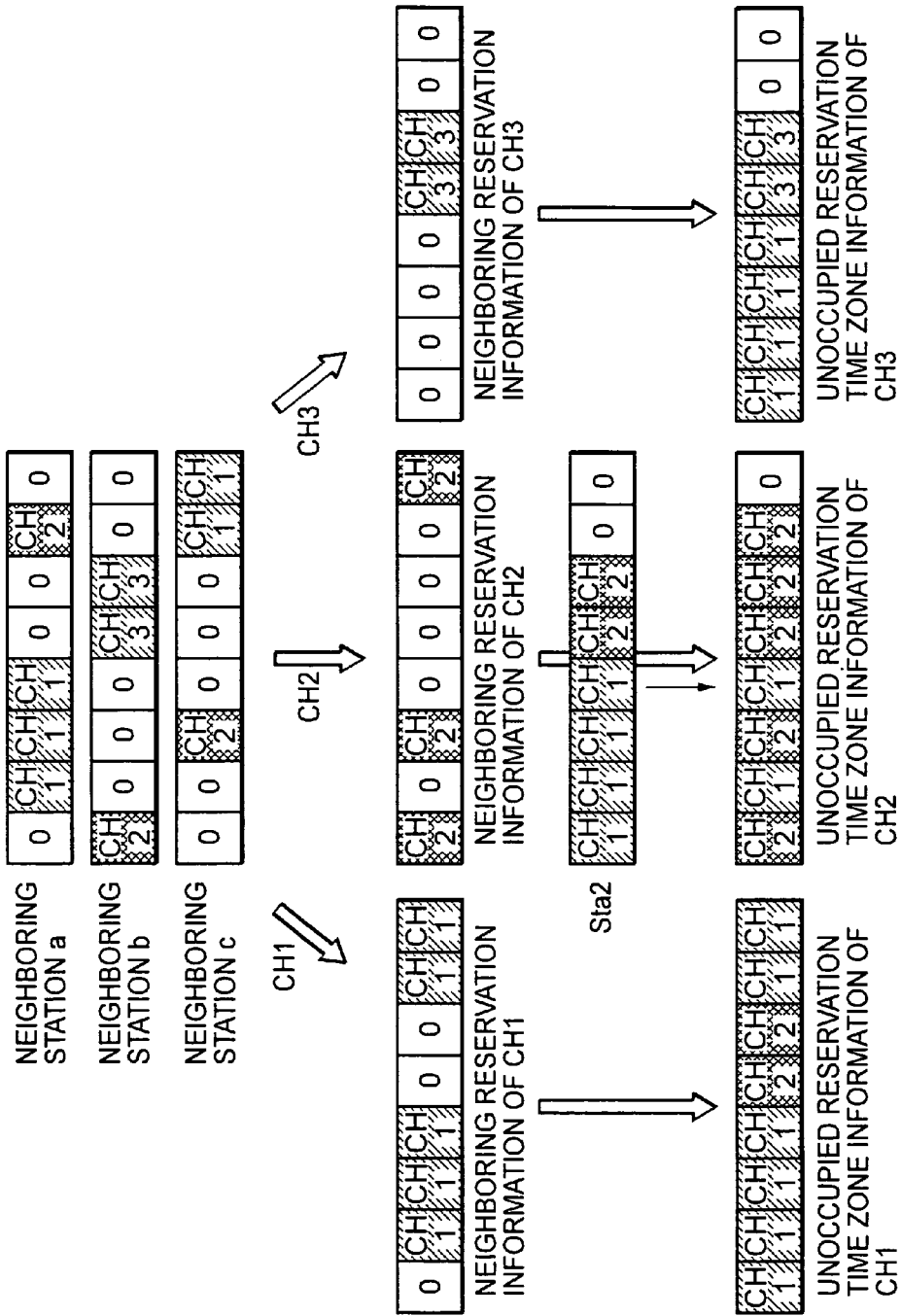
FIG. 10 is a view for explaining an operation procedure for searching a time zone to perform reserved communication in accordance with NBOI described in beacon signals which a communication station Sta1 receives from neighboring stations a, b and c.

The Sta1 receives beacon signals from neighboring stations a, b and c and superposes NBOI received from respective stations for each channel. As a result, neighboring reservation information as shown in the middle of FIG. 10 can be obtained. This shows unoccupied time zones in each communication channel of the Sta1. It is noted that, in the upper portion of FIG. 10, shaded areas indicate reserved zones and meshed areas indicate beacons.

Furthermore, as a result of superposing the NBOI of the Sta2, the transmission destination of the reserved communication, on the obtained result in the middle of FIG. 10, a result shown in the bottom of FIG. 10 is obtained. This shows information regarding to unoccupied time zones during which reservation for communication from Sta1 to Sta2 is available for each communication channel. The Sta1 selects a time zone and a communication channel with which a reservation of a desired length can be ensured. In the example shown in FIG. 10, in a case of ensuring a time zone with two subsequent slots, only the CH3 is applicable. Thus, the last two slots of the CH3 is reserved for a communication time zone from the Sta1 to the Sta2. As a criterion for selecting a communication channel to be reserved, interference information of each channel may be taken into account. The Sta1 describes information regarding to the reserved communication in the NBOI notified in the beacon (signal).

As a result of the above operation, it becomes possible for the Sta1 to substantially know the reservation information of the hidden station, Sta3, by utilizing the NBOI of the Sta2 and to reserve communication with the Sta2 using not conflicting time zones and communication channels even in the self-organized distributed wireless communication system.

Figure 11:
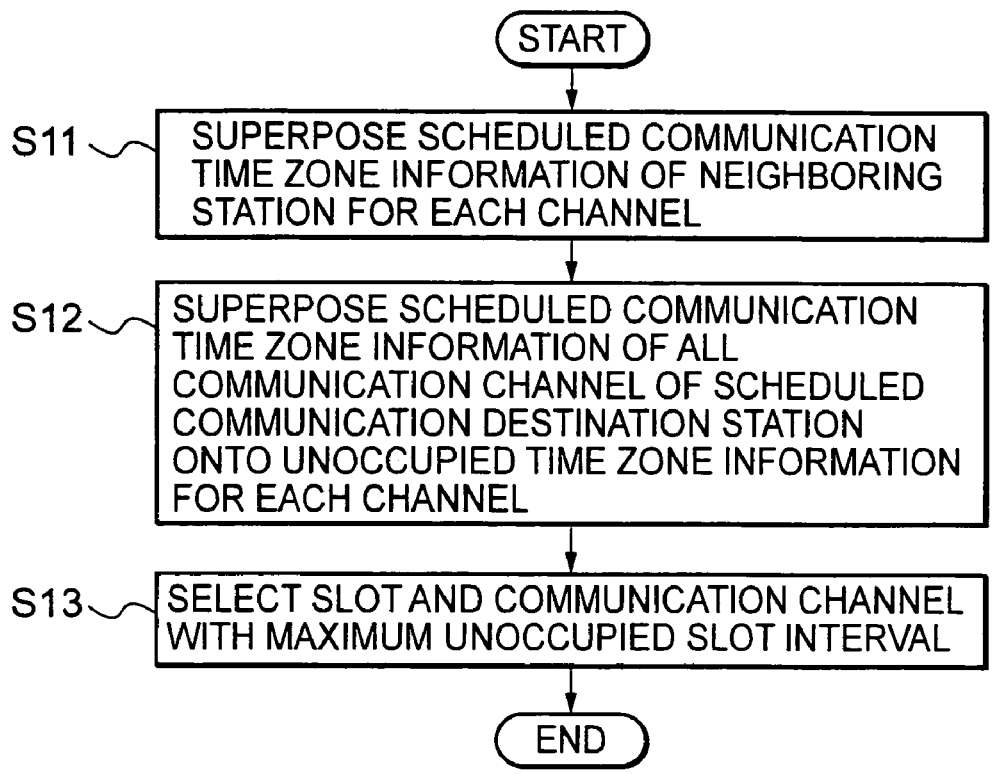
FIG. 11 is a flowchart showing a series of steps performed by a newly entering station for determining a transmission time for transmitting a beacon signal and a communication channel to use in a case where a communication station is allowed to carry out reserved communication.

FIG. 11 shows a series of steps for a case where a new entry station determines a transmission time for transmitting a beacon signal by itself and a communication channel to use in a case where a station is allowed to perform reserved in a flow-chart format.

First, the communication station superposes scheduled communication time zone information of a beacon signal received from a neighboring station for each channel (Step S11). This enables to obtain information concerning unoccupied time zones in each communication channel.

In addition, scheduled communication time zone information in all communication channels of a reserved communication destination station is superposed onto the unoccupied time zone information of each channel as described above (Step S12). This enables to obtain unoccupied time zone information during which communication reservation to the reserved communication destination station is available for each communication channel.

Then, a time zone in which an unoccupied slot interval is the largest and a communication channel thereof are selected as the time zone and the communication channel in which a reserved communication with a reserved communication destination station is carried out (Step S13).

The communication station becomes capable of performing a reserved communication using not conflicting time zones and communication channels even in the self-organized distributed wireless communication system by determining the time zone and communication channel for the reserved communication with a reserved communication destination station in accordance with the above-described procedure.

Next, the operation of the transmissions and the receptions of data between each station which has determined the relative time when the station transmits a beacon signal and the communication channel to be used will be described.

Because each station grasps the relative time when the other stations transmit beacon signals and the frequencies of communication channels, each station switches the communication channels at that time, and receives transmitted beacon signals. In the communication system, as shown in FIGS. 4 and 5 before, a predetermined period of time after the transmission of a beacon signal is a priority period. Consequently, priority data transmissions and receptions between the stations appointed by the beacon signals are enabled.

In the communication system, basically, each station starts access by following processes complying with the CSMA system. However, a station to which a priority period is allotted (hereinafter referred to as a priority station) is given priority by shortening the period of time, or an inter frame space (IFS), for performing carrier sense. On the other hand, a station to which no priority is given tries to access the station which has transmitted a beacon signal by means of carrier sense over the ordinary period of time IFS.

In the communication system, at the same time, a station which cannot receive the beacon signal of a communication channel which a priority station uses, and a station which does not dare to receive the beacon signal because of no necessity of access can perform communication using carrier sensing over the ordinary period of time IFS through another communication channel at this time. That is, in the communication system, the communication channels other than the communication channel to be used by the priority station can be used by a station having a lower order of priority by means of the ordinary carrier sensing over a long period of time. Thereby, in the communication system, a situation in which a plurality of communication channels which are spatially overlapping each other is simultaneously used can be built.

Moreover, in the communication system, at the time of a transmission, each station is required to confirm that no other stations receive any beacon signals at the time and at the frequency of the communication channel to be used. For this reason, each station grasps the time when transmission and the reception of a beacon signal is scheduled using only the information of the communication channel through which transmission is performed on the basis of the transmission and reception time information of the beacon signals and the communication channel information which are held by the other stations. Moreover, each station grasps the time when the frequency of the communication channel which a transmission destination station uses is switched on the transmission and reception time information of the beacon signal of the transmission destination station. Thereby, each station can try transmissions up to the unoccupied time obtained as the result.

Figure 12:
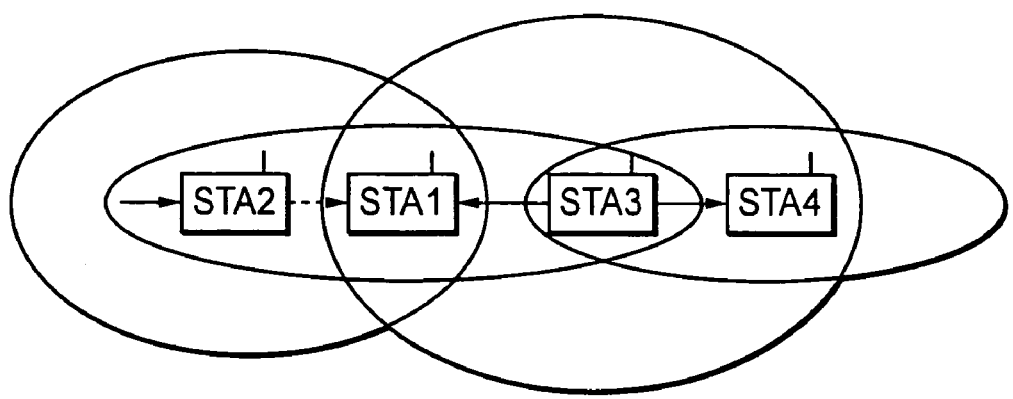
FIG. 12 is a view illustrating a situation in which there are four stations arranged in order that their radio waves may arrive at the stations adjacent to each other as a concrete example of the communication system.

For describing such operation specifically, as shown in FIG. 12, a situation in which four stations STA1, STA2, STA3 and STA4 configured in order that the radio wave radiated from each of the stations STA1, STA2, STA3 and STA4 may reach every neighboring station are present will be considered. That is, it is supposed that the station STA1 can performs the transmissions and the receptions of data with the stations STA2 and STA3, and similarly the stations STA2, STA3 and STA4 can perform the transmissions and the receptions of data with the station STA1, the stations STA1 and STA4, and the station STA3, respectively.

Figure 13:
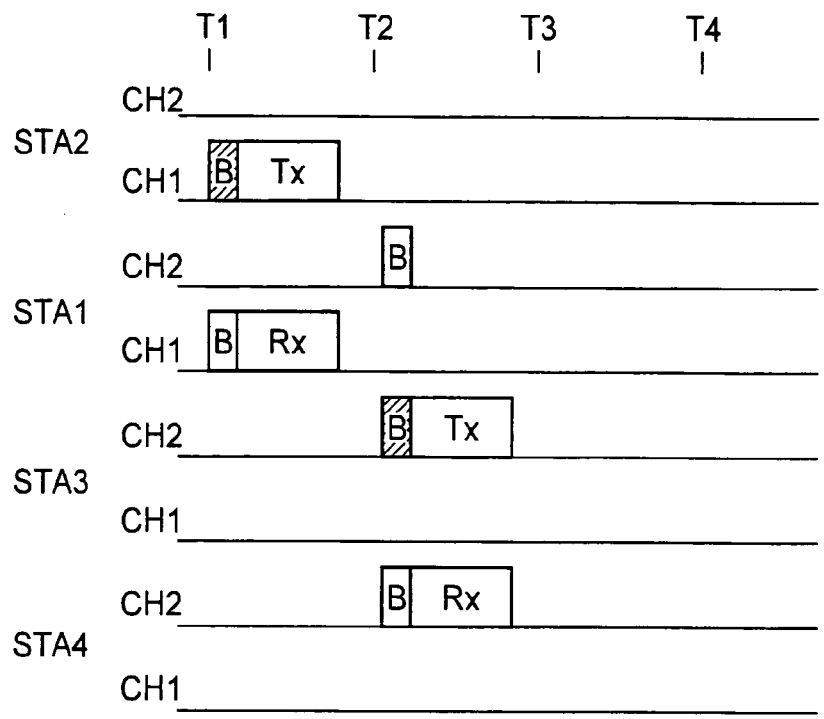
FIG. 13 is a timing chart illustrating the state in which each station performs the transmissions and the receptions of beacon signals and data under the situation shown in FIG. 12.

Under such a situation, the situation as shown in FIG. 13 will be examined. That is, at time T1, the station STA2 uses the communication channel CH1 to transmit data to the station STA1, and the station STA1 receives the transmitted data. Moreover, at the next time T2, the station STA3 uses the communication channel CH2 to transmit data to the station STA4, and the station STA4 receives the transmitted data. Incidentally, in FIG. 13, a part denoted by a letter "B" indicates the time when a beacon signal is transmitted and received. Among the parts "B", the beacon signals shown as the shaded parts indicate on transmission sides. Moreover, in FIG. 13, a part dented by a sign "Tx" indicates the state of transmitting data, and a part denoted by a sign "Rx" indicates the state of receiving data.

Figure 14A:
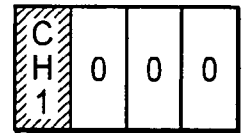
Figure 14B:
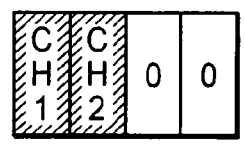
Figure 14C:
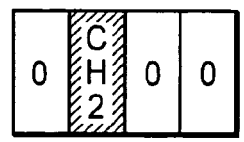
Figure 14D:
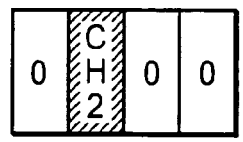

Moreover, it is supposed that each station grasps the information as shown in FIGS. 14A-14D as the transmission and reception time information of beacon signals and the communication channel information. That is, the station STA2 uses the communication channel CH1 at the time T1, as shown in FIG. 14A. The station STA1 uses the communication channel CH1 at the time T1, and switches the communication channel CH1 to CH2 to use the communication channel CH2 at the time T2, as shown in FIG. 14B. Moreover, the station STA3 uses the communication channel CH2 at the time T2, and the station STA4 uses the communication channel CH2 at the time T2.

Now, the station STA2 is noted. The station STA2 continues to transmit data at the time of holding the information shown in FIG. 14A as the transmission and reception time information of the beacon signal pertaining to the station STA2 itself and the communication channel information. The transmission means the ineffectual use of a band.

Accordingly, the station STA2 extracts the information of the communication channel which the station STA2 uses from the time information of beacon signals and the communication channel information, which have been obtained at the time of entering the network newly and are related to the other stations. The station STA2 executes the logical addition of the extracted information, and also executes the logical addition regarding the time information in the other communication channel of the transmission destination station STA1. Thereby, the station STA2 can obtain the information indicating time receiving a beacon signal at STA2, as shown in FIG. 15A. That is, the station STA2 can grasp that the station STA1 switches the communication channel from CH1 to CH2 at the time T2, and can avoid the situation in which the transmission of data to the station STA1 is continued in vain.

Similarly, when the station STA3 is noted, the station STA3 can use the information pertaining to the stations STA1 and STA4 to obtain the information indicating time receiving a beacon signal at STA3, as shown in FIG. 15B. Then, the station STA3 can grasp that the station STA3 can communicate with the station STA4 using the communication channel CH2 at the period of time from the time T1 to the time T2.

As described above, in the communication system, each station grasps the maximum transmittable period of time, which is the maximum period of time during which data can be transmitted, by grasping the switching time of the frequency of the communication channel to be used by a transmission destination station on the basis of transmission and reception time information of the beacon signals of peripheral stations in the communication channel to be scheduled to perform a transmission, and on the basis of the transmission and reception time information of the beacon signals in the other communication channels of a transmission destination station. After that, each station tries to transmit the data. Thereby, each station can try to perform a transmission up to the obtained unoccupied time, and can utilize the communication channel to the utmost limit.

Lastly, a measure for avoiding interference channels in the communication system performing such data transmissions and receptions will be described.

In the communication system, when there are many errors, or when signals cannot be demodulated but received signal levels are large, the communication channel used at that time can be considered to have interference, and the frequencies of the communication channels used by the own station and the other stations are changed.

Now, in the communication system, the presence of the other systems using the same frequency band is detected as follows.

Generally, a preamble is provided at the beginning of a packet to be transmitted and received in a wireless LAN of the so-called IEEE 802.11 system and the like, as already explained with reference to FIGS. 2 and 3 above. Accordingly, in the present embodiment, the preamble used in the own system is made to be in common with those of the other systems. In this case, the generation of a packet can be detected by means of the preamble. On the other hand, when information after the preamble includes errors, each station can judge that the information concerns the packet of another system.

Each station measures the number of the generation of packets of the other systems in such a way, and detects the frequency of the generation.

Moreover, because the reception time in each communication channel is not uniform, for example, as shown in FIG. 16, each station records the reception time (standby time) in each communication channel as well as the numbers of generation of packets (numbers of data errors) of the other systems. Then, when reception time exceeds a predetermined period of time, each station uses the number of data errors at that time as an effective value to be used at the judgment of a change of a communication channel. Incidentally, in FIG. 16, when the standby time is "100", the data is used as the number of effective data errors.

Figure 17:
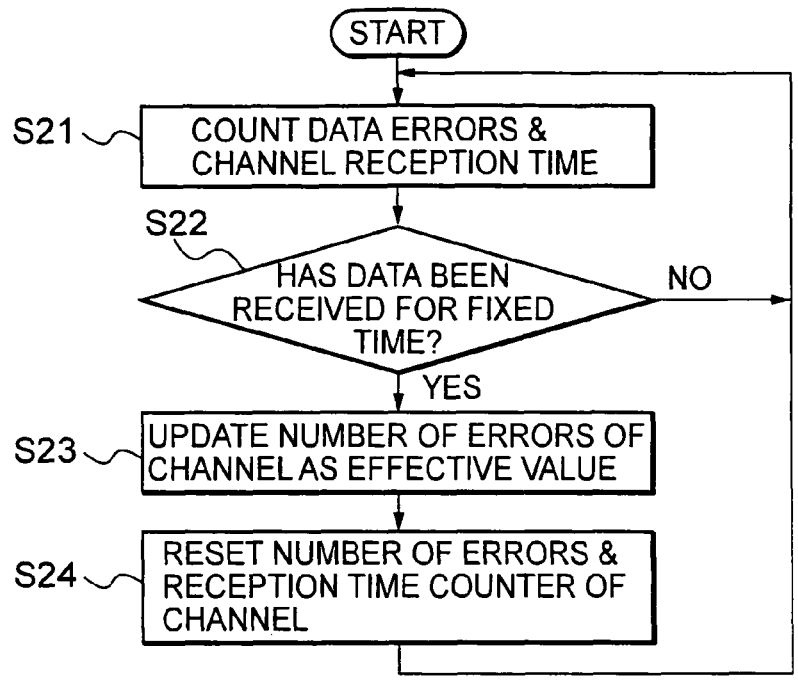
FIG. 17 is a flowchart illustrating a series of processes when each station detects the presence of the other systems on the number of data errors and reception time.

To put it more concretely, each station executes a series of processes shown in FIG. 17 to detect the presence of the other systems on the numbers of data errors and reception time.

First, each station, as shown in FIG. 17, at a step S21, counts the numbers of data errors and the reception time in each communication channel. At a step S22, each station judges whether reception has performed for a predetermined period of time or not.

Now, when each station judges that reception has not been performed for the predetermined period of time yet, each station repeats the processes from the step S21. On the other hand, when each station judges that the reception has performed for the predetermined period of time, each station updates the number of data errors in the corresponding communication channel as an effective value to record the value at a step S23.

Then, each station, at a step S24, resets the counter recording the numbers of data errors and the reception time in the corresponding communication channel, and repeats the processes from the step S11 again.

Each station executes such a series of processes to make it possible to compare the numbers of data errors and the reception time at the same measurement period of time, and to update them every fixed period of time. Thereby, each station can detect the presence of the other systems.

Then, when each station has judged that some interference including the detected interference from the other systems is large, each station changes the using communication channel.

Now, when the detection of interference is performed on a receiver side, the receiving station transmits a request message to the transmitting station which transmits the data using the communication channel in which the interference is generated for changing the communication channel. Then, when the transmitting station receives the request message, the transmitting station stops using the transmission time of the present beacon signal and the communication channel. Then, the transmitting station executes the processes similar to the processes at the newly entering into the network, which processes have been described with reference to FIG. 7 before, and thereby the transmitting station changes the transmission time of beacon signals to another communication channel.

Figure 18:
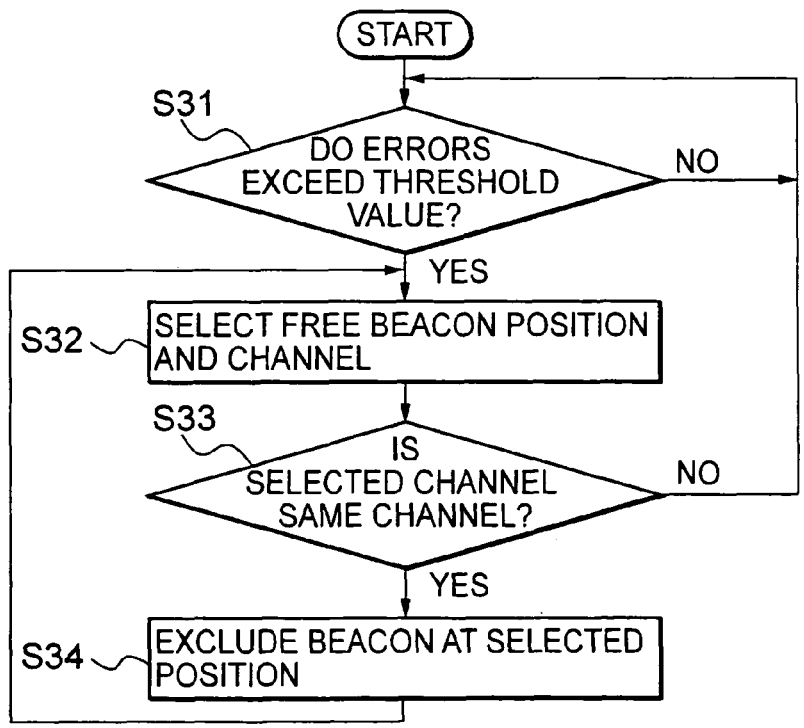
FIG. 18 is a flowchart illustrating a series of processes when the transmission time of beacon signals and a communication channel to be used are changed in the case where a receiving station performs the detection of interference.
Figure 19:
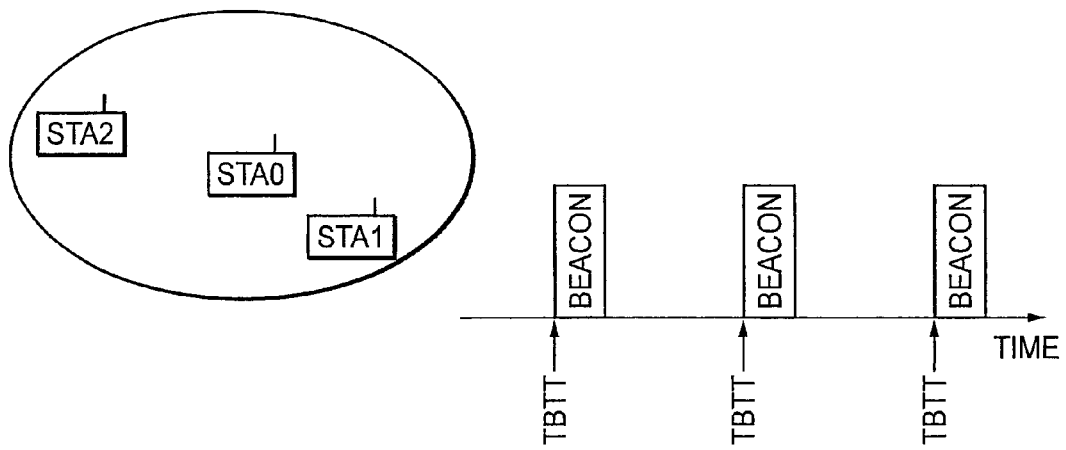
FIG. 19 is a view illustrating an example of the configuration of a wireless LAN of an IEEE 802.11 system at an infrastructure mode and a state of beacon signals to be transmitted.
Figure 20:
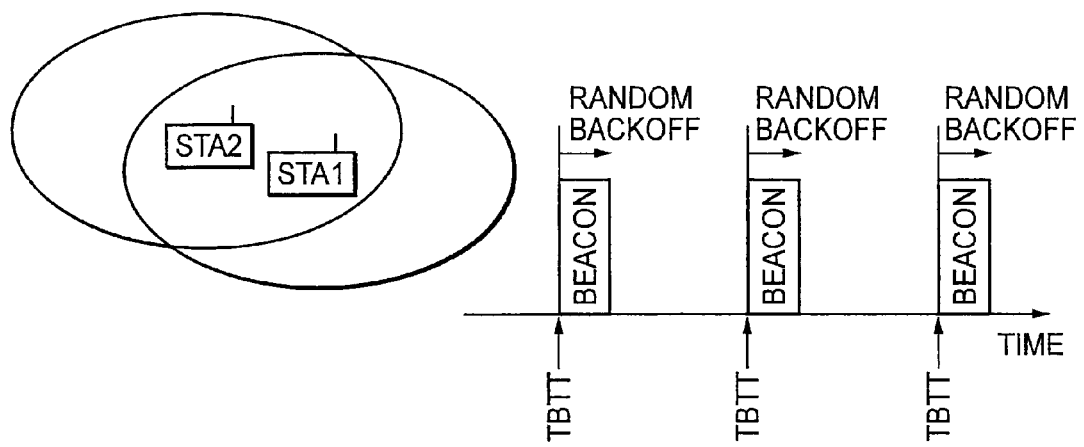
FIG. 20 is a view illustrating an example of the configuration of a wireless LAN of the IEEE 802.11 system at an ad hoc mode and a state of beacon signals to be transmitted.
Figure 21:
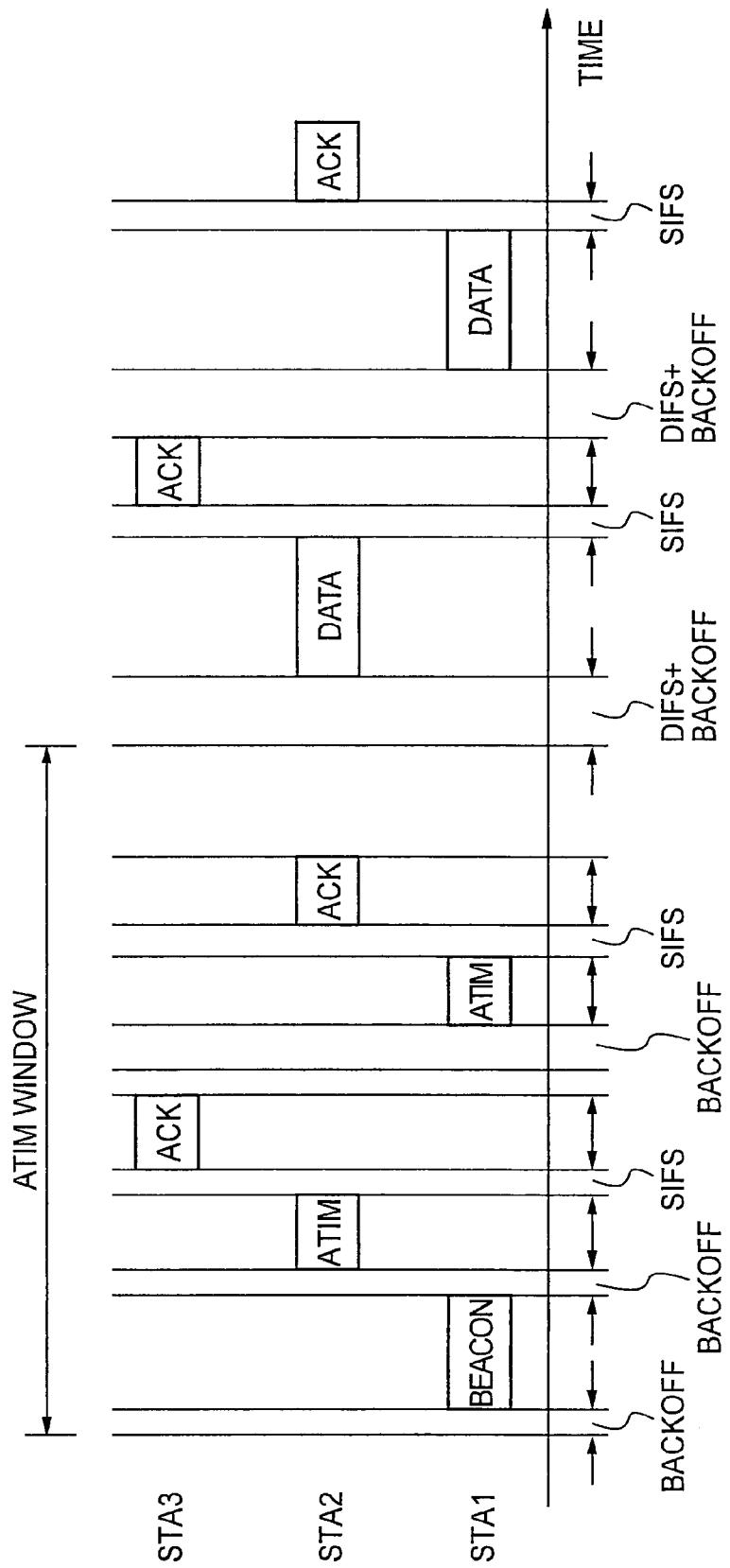
FIG. 21 is a view illustrating a state of a transmission and reception procedure between a plurality of stations in a wireless LAN of the IEEE 802.11 system at the ad hoc mode.

In specific, in the communication system, a series of processes as shown in FIG. 18 is performed between the receiving station and the transmitting station in cooperation, and thereby the transmission time of beacon signals and the communication channel to be used are changed.

First, the receiving station, as shown in FIG. 18, at a step S31, judges whether the number of data errors exceeds a predetermined threshold value or not, and thereby judges whether interference is generated or not.

Now, in a case where the receiving station judges that no interference is generated, the receiving station continues the measurement. On the other hand, in a case where the receiving station judges that interference is generated, the receiving station transmits the above-mentioned request message to the transmitting station.

After receiving the request message, the transmitting station selects unoccupied transmission time and a communication channel capable of transmitting a beacon signal in response to the request message, at a step S32. The process may be performed by executing the steps shown in FIG. 7 above.

Successively, the transmitting station judges whether the selected communication channel is the same communication channel as that of being used at present or not at a step S33.

Hereupon, in a case where the transmitting station judges that the selected communication channel is not the same one, the transmitting station changes the transmission time of the beacon signals and the communication channel to be used, and continues to perform the communication using the changed transmission time and the communication channel until the transmitting station receives a request message from the receiving station.

On the other hand, in a case where the transmitting station judges that the selected communication channel is the same one, the transmitting station does not change the transmission time of the beacon signals and the communication channel except the beacon signal at the selected transmission time at a step S34. Then, the transmitting station shifts to the step S32 again, and selects a new transmission time and a communication channel.

In the communication system, in a case where the receiving station detects interference, a series of processes as described above is performed between the receiving station and the transmitting station. Thus, the transmission time of beacon signals and the communication channel to be used are changed, and thereby interference can be avoided.

Incidentally, in the communication system, the detection may possibly be preformed on the transmission side by another method different from the method described above. In such a case, the transmitting station changes a communication channel depending on whether or not there is a response from a receiving station.

In a wireless LAN of the IEEE 802.11 system or the like, there is the control using a so-called request to send (RTS) signal and a clear to send (CTS) signal for solving the so-called hidden station problem. Moreover, a station which has received data replies a so-called acknowledgement (ACK) signal. That is, in the wireless LAN of the IEEE 802.11 system or the like, responses with a CTS signal or an ACK signal are made to the transmission of an RTS signal and data.

However, in the wireless LAN of the IEEE 802.11 system or the like, in a case where interference is generated in the communication channel to be used and communication quality is bad, there occurs a situation in which these responses do not arrive at the transmission side.

Accordingly, in the communication system, a transmitting station counts the number of times of nonexistence of responses to detect the frequency of the occurrences of the nonexistence of responses. Then, in a case where the frequency exceeds a predetermined value, the transmitting station executes the processes similar to the processes at the newly entering the network, which processes have been explained with reference to FIG. 7 above, and thereby the transmitting station changes the transmission time of the beacon signal and the communication channel to be used.

As described above, in the communication system, even when a transmitting station detects interference, the interference can be avoided by changing the transmission time of a beacon signal and a communication channel to be used.

As described above, in the communication system shown as the embodiment of the present invention, when a plurality of stations operate in accordance with self-organized distributed control, each station holds time information pertaining to the transmission and reception time of a beacon signal and communication channel information pertaining to a communication channel, and periodically transmits beacon signals at a predetermined time interval on the basis of the information. Thereby, while access control by carrier sensing is performed, a plurality of communication channels can be simultaneously used. Consequently, the building of a network capable of increasing a channel capacity extremely with a low cost can be easily performed.

At this time, time information and communication channel information which are grasped by a station which transmits the beacon signal are described in the beacon signal. Then, in the communication system, a new entry station grasps the receivable time information of a beacon signal and a communication channel through which the beacon signal is transmitted on time information and communication channel information described in a beacon signal received from another station. Consequently, the new entry station can suitably grasp the situation of the other stations.

Then, the communication system can avoid a situation in which a new entry station transmits a beacon signal at time and through a communication channel through which the other stations receive beacon signals by determining the transmission time of beacon signals which the new entry station transmits and a communication channel to be used, on the basis of the time information and the communication channel information, which the new entry station has grasped.

Moreover, in the communication system, a new entry station selects the time having the maximum interval during which no beacon signals are transmitted and received as transmission time when the new entry station transmits a beacon signal on the basis of the neighboring station time zone information (for example, logical addition information) produced by superposing all pieces of the time information and the communication channel information which have received from the other stations and are described in the beacon signals. Moreover, the new entry station divides the produced logical addition information into the logical addition information of each communication channel, and evaluates the selected transmission time of the beacon signal at every communication channel to select the communication channel having the maximum interval during which no beacon signals are transmitted and received as the communication channel through which the new entry station transmits a beacon signal. Thereby, the transmissions and the receptions of beacon signals by each station can be dispersed as much as possible, and the period of time up to the next time beacon signal can be severally maximized. Consequently, in the communication system, communication time can be fairly divided to each station, and a communication channel by which the channel capacity is maximized can be allotted.

Moreover, in the communication system, each station tries to transmit data after each station has grasped the maximum transmittable period of time, which is the maximum period of time in which the data can be transmitted, on the basis of time information pertaining to transmission and reception time of the beacon signals from the other stations in a communication channel through which transmission is scheduled, and the time information pertaining to the transmission and reception time of beacon signals in another communication channel of a transmission destination station. Consequently, unoccupied periods of time of the communication channel through which transmission is scheduled can be suitably grasped, and the trial of transmission up to the unoccupied time becomes enabled. Thereby, the communication channel can be used to the utmost limit.

Moreover, in the communication system, a preamble provided in a packet to be transmitted and received is made to be common with preamble used in the other systems. Each station detects the generation of a packet of another system by an error of the information after the preamble, and changes the used communication channel on the frequency of the generation of the packets of other systems. Thereby, each station can detect the interference from the other systems, and can flee to another communication channel having less interference. Consequently, in the communication system, the collisions of data become less, and the improvement of throughput can be achieved.

Moreover, in the communication system, each station records reception time at each communication channel as well as the frequency of the generation of packets in the other systems. In a case where the reception time exceeds a predetermined period of time, by updating the number of errors at that time as an effective value used for judgment of a change of the communication channel, the interference situations of the other systems can be fairly compared between communication channels. By continuous performing of update of the material to be used for the judgment of changes of the communication channel, it becomes possible to consider a change of an interference situation suitably.

Moreover, in the communication system, in a case where interference is detected on a reception side, it is possible to request a transmitting station transmitting data using the communication channel in which interference is generated to change the transmission time of beacon signals and the communication channel to be used, and thereby the use of the communication channel having a bad reception situation can be avoided to change the communication channel to better one suitably.

Moreover, in the communication system, in a case where interference is detected on a transmission side, the number of times of nonexistence of responses from a receiving station to receive data is measured. When the frequency of the nonexistence of responses exceeds a predetermined value, the transmission time of beacon signals and the communication channel to be used are changed. Thereby the deterioration of the reception situation of a transmission destination can be recognized on the transmission side, the communication channel can be suitably changed spontaneously on own judgment of the transmission side.

In the above description, the present invention has been precisely described with reference to the specific embodiments. However, those skilled in the art may made any modification or substitution to the present embodiment without departing from the scope and the sprit thereof.

In the above-mentioned embodiment, the case where the present invention is applied to the wireless LAN similar to the IEEE 802.11 system has been described. However, the present invention is not limited to the above-mentioned embodiment, and can be applied similarly to any wireless communication system adopting a self-organized distributed control system.

In the present specification, a case where each communication station performs access control on media while avoiding collision of signals in accordance with the detection of the transmission signals from the other communication stations and a case where access to media is performed by reserved communication or priority communication in the wireless network of a self-organized distributed type have been described as main embodiments of the present invention. However, the present invention is not limited to these examples, and may be similarly applied to communication systems employing other media accessing method than those listed above.

In addition, in the present specification, the embodiments in which the present invention is applied to the wireless network of the self-organized distributed type have been mainly explained, however, the present invention may be similarly applied to networks other than the self-organized distributed type.

In short, the present invention has been disclosed in exemplary modes and should not be interpreted limitedly. Claims following hereto should be referred to in-order to understand the subject matter of the present invention.

The invention claimed is:

1. A communication system forming a network having no relationship of a controlling station and a controlled station, in which a plurality of communication stations respectively operate in a self-organized distributed control manner using a plurality of communication channels, wherein
   each of the communication stations manages at least time information concerning transmission/reception time of a beacon signal and communication channel information concerning a communication channel to use,
   a transmitting communication station trying to transmit the beacon signal or data switches a communication channel to use in accordance with the time information and the communication channel information to transmit the beacon signal or the data,
   a receiving communication station trying to receive the beacon signal or the data switches the communication channel to use in accordance with the time information and the communication channel information to receive the beacon signal or the data,
   each of said communication stations notifies said time information and said communication channel information by describing in the beacon signal, and grasps a time and a communication channel at and through which another communication station carries out communication in accordance with said time information and said communication channel information described in the beacon signal received from the another communication station, and
   a new entry communication station newly entering said network produces neighboring station time zone information regarding a time zone already used by the another communication station by superposing said time information and said communication channel information described in the beacon signal received from the another communication station, and determines transmission time for transmitting a beacon signal of the new entry communication station and a communication channel used for transmitting the beacon signal of the new entry communication station.

2. The communication system according to claim 1, wherein each of said communication stations determines a time to transmit the beacon signal, a time to carry out data communication and a communication channel to use in accordance with said grasped time and communication channel at and through which the another communication station carries out communication.

3. The communication system according to claim 1, wherein said new entry communication station selects a time having a maximum interval during which no beacon signals are transmitted/received in the another communication station to determine as a transmission time of the beacon signal of the new entry communication station.

4. The communication system according to claim 3, wherein the new entry communication station divides said neighboring station time zone information into neighboring station time zone information of each communication channel, and evaluates a time having a maximum interval during which no beacon signals are transmitted/received in the another communication station at every communication channel to select a communication channel having the maximum interval during which no beacon signals are transmitted and received as a communication channel through which the new entry station transmits a beacon signal.

5. The communication system according to claim 1, wherein each of said communication stations determines a time to carry out reserved communication or priority communication and a communication channel to use for the reserved communication or the priority communication in accordance with said grasped time and communication channel at and through which the another communication station carries out communication.

6. The communication system according to claim 5, wherein a communication station trying to perform data communication with a specific communication destination:
   produces neighboring station time zone information for every communication channel by superposing said time information and said communication channel information described in the beacon signal received from the another communication station at every communication channel,
   obtains available time zone information regarding to a time zone available for communication with said communication destination for every communication channel by superposing time information in all communication channels of said communication destination on said neighboring station time zone information for every communication channel, and
   determines a communication channel to use for communication with the communication destination and a time zone during which the communication is performed in accordance with said available time zone information for every communication channel.

7. The communication system according to claim 1, wherein each of said communication stations transmits data after grasping a maximum transmission available time being a maximum time available for data transmission in a transmission scheduled communication channel in accordance with time information regarding to a transmission/reception time of the beacon signal of the another communication station and time information regarding to a transmission/reception time of the beacon signal in another communication channel of the another communication station.

8. A communication system forming a network having no relationship of a controlling station and a controlled station, in which a plurality of communication stations respectively operate in a self-organized distributed control manner, using a plurality of communication channels, wherein
   each of the communication stations manages at least time information concerning transmission/reception time of a beacon signal and communication channel information concerning a communication channel to use,
   a transmitting communication station trying to transmit the beacon signal or data switches a communication channel to use in accordance with the time information and the communication channel information to transmit the beacon signal or the data,
   a receiving communication station trying to receive the beacon signal or the data switches the communication channel to use in accordance with the time information and the communication channel information to receive the beacon signal or the data, and
   each of said communication stations transmits a packet having a preamble common to another wireless communication system and detects generation of a packet from the another system depending on an error after a preamble in a received packet so as to change a communication channel in use, wherein each of said communication stations records occurrence frequency of packets from the another system together with a reception time of each communication channel and uses the number of errors when the reception time exceeds a predetermined time period as an effective value in judgment for changing the communication channel.

9. A communication system forming a network having no relationship of a controlling station and a controlled station, in which a plurality of communication stations respectively operate in a self-organized distributed control manner, using a plurality of communication channels, wherein each of the communication stations manages at least time information concerning transmission/reception time of a beacon signal and communication channel information concerning a communication channel to use, a transmitting communication station trying to transmit the beacon signal or data switches a communication channel to use in accordance with the time information and the communication channel information to transmit the beacon signal or the data, a receiving communication station trying to receive the beacon signal or the data switches the communication channel to use in accordance with the time information and the communication channel information to receive the beacon signal or the data, and upon detecting an interference, the transmitting communication station transmitting data counts a number of times receiving no response from the receiving communication station and requests changing of the transmission time of the beacon signal and the communication channel to use in response to a frequency of no response exceeding a predetermined value.

10. A communication method for forming a network having no relationship of a controlling station and a controlled station, in which a plurality of communication stations respectively operate in a self-organized distributed control manner, using a plurality of communication channels, the method comprising:

managing, at each of the communication stations, at least time information concerning a transmission/reception time of a beacon signal and communication channel information concerning a communication channel to be used;

switching, at a transmitting communication station trying to transmit the beacon signal or data, a communication channel to be used in accordance with the time information and the communication channel information to transmit the beacon signal or the data;

switching, at a receiving communication station trying to receive the beacon signal or the data, the communication channel to be used in accordance with the time information and the communication channel information to receive the beacon signal or the data, said time information and said communication channel information are described in the beacon signal;

grasping a time and a communication channel at and through which another communication station performs communication in accordance with said time information and said communication channel information described in the beacon signal received from the another communication station;

producing, at each of the communication stations upon newly entering said network, neighboring station time zone information regarding a time zone already used by the another communication station by superposing said time information and said communication channel information described in the beacon signal received from the another communication station; and determining, at each of the communication stations upon newly entering said network, a transmission time of a beacon signal and a communication channel to use for transmitting the beacon signal in accordance with the neighboring station time zone information.

11. The communication method according to claim 10, further comprising:

selecting, at each of the communication stations upon newly entering said network a time having a maximum interval during which no beacon signals are transmitted/received in the another communication station to determine as a transmission time of the beacon signal in accordance with said neighboring station time zone information.

12. The communication method according to claim 11, further comprising:

dividing, at each of the communication stations upon newly entering said network, said neighboring station time zone information into neighboring station time zone information of each communication channel, and evaluating a time having a maximum interval during which no beacon signals are transmitted/received in the another communication station at every communication channel to select a communication channel having the maximum interval during which no beacon signals are transmitted and received as a communication channel through which to transmit a beacon signal.

13. The communication method according to claim 10, further comprising:

determining, at each of the communication stations, a time to carry out a reserved communication or a priority communication and a communication channel to use for the reserved communication or the priority communication in accordance with said grasped time and communication channel at and through which the another communication station carries out communication.

14. The communication method according to claim 13, further comprising performing the following steps at each of the communication stations at a time of trying to start data communication with a specific communication destination:

producing neighboring station time zone information for every communication channel by superposing said time information and said communication channel information described in the beacon signal received from the another communication station at every communication channel, obtaining available time zone information regarding a time zone available for communication with said communication destination for every communication channel by superposing time information in all communication channels of said communication destination on said neighboring station time zone information for every communication channel, and determining a communication channel to use for communication with the communication destination and a time zone during which the communication is performed in accordance with said available time zone information for every communication channel.

15. The communication method according to claim 10, further comprising:

transmitting, by each of the communication stations, data after grasping a maximum transmission available time being a maximum time available for data transmission in a transmission scheduled communication channel in accordance with time information regarding a transmission/reception time of the beacon signal of the another communication station and time information regarding a transmission/reception time of the beacon signal in another communication channel of the receiving communication station.

16. A communication method of forming a network having no relationship of a controlling station and a controlled station, in which a plurality of communication stations respectively operate in a self-organized distributed control manner, using a plurality of communication channels, the method comprising:

managing, at each of the communication stations, at least time information concerning a transmission/reception time of a beacon signal and communication channel information concerning a communication channel to be used;

switching, at a transmitting communication station trying to transmit the beacon signal or data, a communication channel to be used in accordance with the time information and the communication channel information to transmit the beacon signal or the data;

switching, at a receiving communication station trying to receive the beacon signal or the data, the communication channel to be used in accordance with the time information and the communication channel information to receive the beacon signal or the data;

transmitting, from each of the communication stations, a packet having a preamble common to another wireless communication system;

detecting generation of a packet from the another system depending on an error in information after a preamble in a received packet so as to change a communication channel in use; and recording, at each of the communication stations, occurrence frequency of packets from the another system together with a reception time of each communication channel and using the number of errors when the reception time exceeds a predetermined time period as an effective value in judgment for changing the communication channel.

17. A communication method of forming a network having no relationship of a controlling station and a controlled station, in which a plurality of communication stations respectively operate in a self-organized distributed control manner, using a plurality of communication channels, the method comprising:

managing, at each of the communication stations, at least time information concerning a transmission/reception time of a beacon signal and communication channel information concerning a communication channel to be used;

switching, at a transmitting communication station trying to transmit the beacon signal or data, a communication channel to be used in accordance with the time information and the communication channel information to transmit the beacon signal or the data;

switching, at a receiving communication station trying to receive the beacon signal or the data, the communication channel to be used in accordance with the time information and the communication channel information to receive the beacon signal or the data and counting, upon detecting an interference, the number of times receiving no response from the receiving communication station and requesting changing of the transmission time of the beacon signal and the communication channel to use in response to a frequency of no response exceeding a predetermined value.

18. A communication station configured to operate in a system forming a network having no relationship of a controlling station and a controlled station, in which a plurality of communication stations respectively operate in a self-organized distributed control manner using a plurality of communication channels, the communication station comprising:

a base band unit configured to manage at least time information concerning transmission/reception time of a beacon signal and communication channel information concerning a communication channel to use;

the base band unit configured to switch a communication channel to transmit the beacon signal or data in accordance with the time information and the communication channel information;

the base band unit configured to switch the communication channel to receive the beacon signal in accordance with the time information and the communication channel information, and the base band unit configured to transmit a packet having a preamble common to another wireless communication system and detect generation of a packet from the another system depending on an error after a preamble in a received packet so as to change a communication channel in use; and the base band unit configured to record occurrence frequency of packets from the another system together with a reception time of each communication channel and use the number of errors when the reception time exceeds a predetermined time period as an effective value in judgment for changing the communication channel.

19. A communication station configured to operate in a system forming a network having no relationship of a controlling station and a controlled station, in which a plurality of communication stations respectively operate in a self-organized distributed control manner using a plurality of communication channels, the communication station comprising:

a base band unit configured to manage at least time information concerning transmission/reception time of a beacon signal and communication channel information concerning a communication channel to use;

the base band unit configured to switch a communication channel to use in accordance with the time information and the communication channel information to transmit the beacon signal or the data;

the base band unit configured to switch the communication channel to use in accordance with the time information and the communication channel information to receive the beacon signal or the data; and the base band unit configured to, upon detecting interference, count a number of times receiving no response from another communication station to which data was transmitted, and request changing of the transmission time of the beacon signal and the communication channel to use in response to a frequency of no response exceeding a predetermined value.

* * * * *